Figure 1:
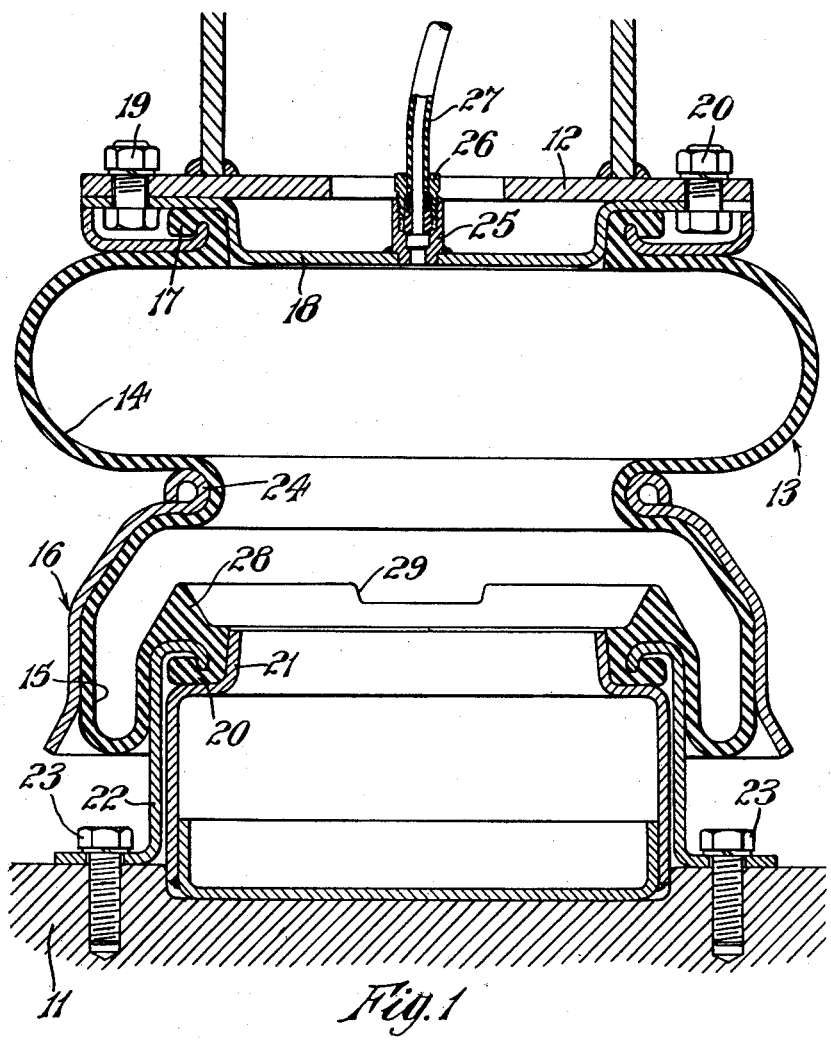

March 12, 1963  A. A. SELMAN  3,081,075
FLUID SPRINGS

Filed Feb. 5, 1960  3 Sheets-Sheet 2

INVENTOR
Alan Albert Selman
by Benj. T. Rauber
his attorney

March 12, 1963  A. A. SELMAN  3,081,075
FLUID SPRINGS

Filed Feb. 5, 1960  3 Sheets-Sheet 3

INVENTOR
Alan Albert Selman
by Benj. T. Rauber
his attorney

United States Patent Office 3,081,075
Patented Mar. 12, 1963

3,081,075
FLUID SPRINGS
Alan Albert Selman, Leigh-on-Sea, England, assignor to Dunlop Rubber Company Limited, London, England, a company of Great Britain
Filed Feb. 5, 1960, Ser. No. 7,042
Claims priority, application Great Britain Feb. 6, 1959
7 Claims. (Cl. 267—65)

The present invention relates to a fluid spring to be located between two relatively-displaceable members.

In one proposal which has been made the displacement of one member slidably mounted on a second member is controlled by a fluid spring which is in the form of two flexible fluid chambers so arranged on opposite sides of the slidable member that one is compressed and the other expanded by movement of the slidable member in one sense and the said other compressd and said one expanded by movement of the slidable member in the opposite sense. The two chambers of the fluid spring are filled with pressure-fluid and connected with each other through a restricted passage whereby sliding movements of the slidable member in one sense or the other compresses one of the chambers and causes fluid therein to be transferred to the other chamber. The arrangement is such that during compression of either chamber the flexible walls thereof are so guided as to cause the walls to form an annular lobe. Such lobes have certain advantages and can be arranged to provide desirable damping characteristics.

In another proposal which has been made the relative displacement of two members is restrained by a fluid spring in the form of a fluid-containing flexible annular body which is connected at its ends to the two members respectively and is so arranged that upon a moving together of the two members the annular body forms at each end an annular lobe.

It has been found that although the above described fluid spring arrangements provide some of the desired damping characteristics they do not meet the full requirements called for in a fluid spring to be used for example in a vehicle suspension system and it is one object of the present invention to provide an improved fluid spring for such a suspension system.

According to the present invention there is provided a fluid spring to be located between two relatively-displaceable members comprising a resilient hollow body for pressure-fluid, said hollow body being adapted to be connected at one end to one of the two members and at the other end to the other of said members and being formed in the region of one end thereof into a single or multiple convolution bellows and in the region of the other end into a lobe so arranged as to roll in the direction of said relative displacement to permit compression and expansion of the spring.

Figure 2:
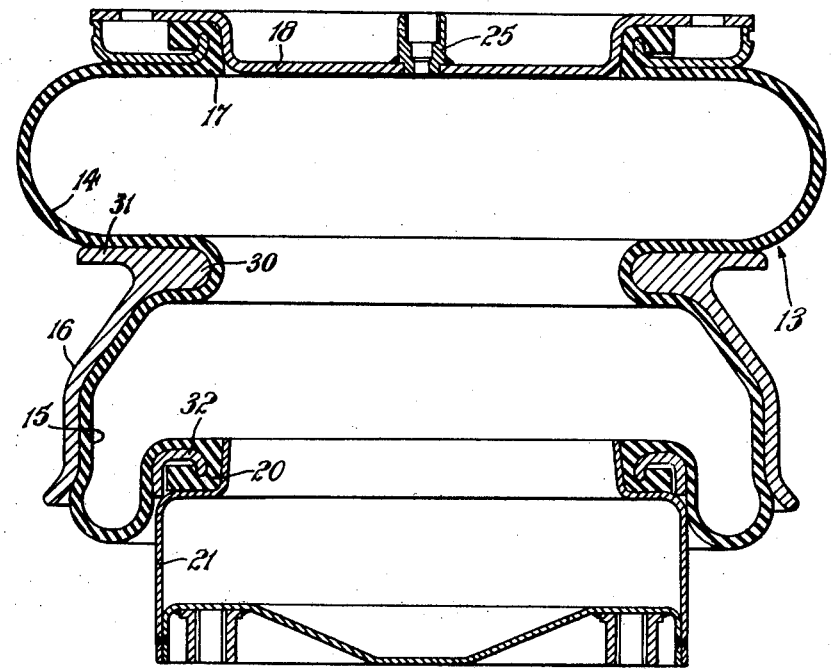
Figure 3:
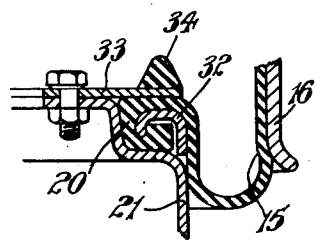
Figure 4:
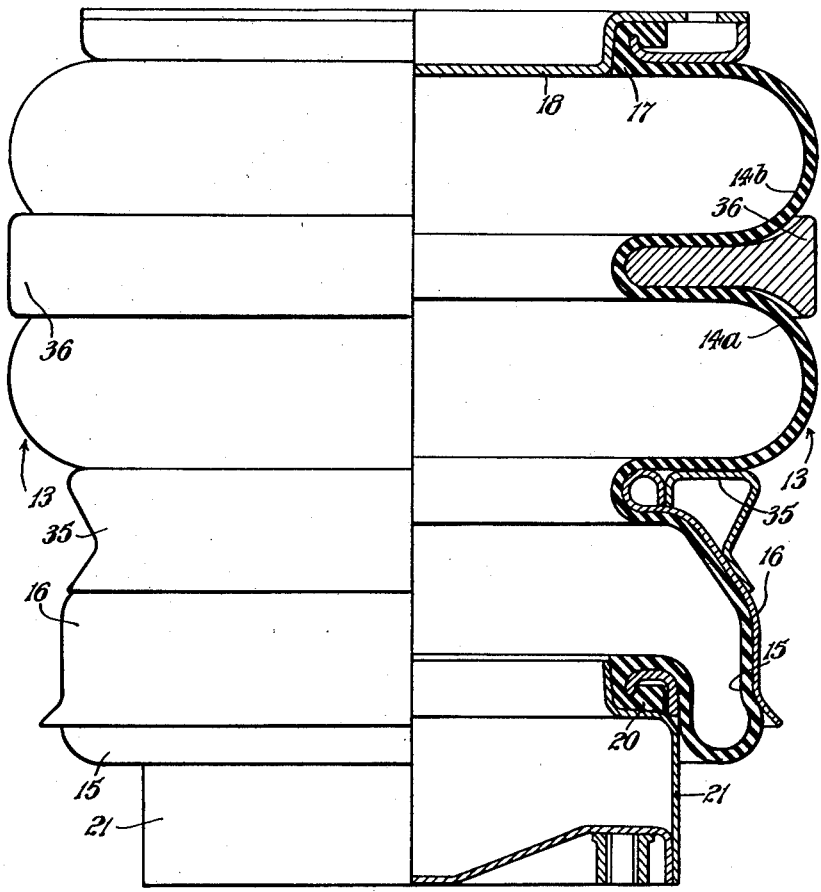

Some embodiments of the invention will now be described by way of example with reference to the accompanying drawings in which:

FIGURE 1 is a cross-sectional side elevation of a fluid spring according to a first embodiment of the invention for use in a vehicle suspension system, FIGURE 2 is a cross-sectional side elevation of a fluid spring according to a second embodiment of the invention, FIGURE 3 is a part view of a modification of the embodiment shown in FIGURE 2, and FIGURE 4 is a part cross-sectional side elevation of a third embodiment of the invention.

Referring first to FIGURE 1, a vehicle axle carrying member 11 is suspended from a chassis member 12 by a fluid spring formed by a flexible annular hollow body 13 arranged to form a bellows section 14 and a rolling annular lobe section 15. A rigid annular retaining member 16 for a purpose hereinafter to be described is carried on the outside of the body 13. The annular body 13 is composed of rubber or like resilient material provided with a cord reinforcement and is formed at its upper end with a peripheral grooved lip 17 which is secured to a circular mounting plate 18 bolted to the chassis member 12 by bolts 19 and 20 to form one end member of the fluid spring. At its lower end the body 13 is formed with a peripheral grooved lip 20 which engages the outer surface of a cylindrical open-ended plunger 21 which fits into a recess in the member 11, and the lip 20 is secured to said surface by securing ring 22 removably connected to the member 11 by bolts 23 to form a second end member of lesser pressure area than the first end member.

The annular retaining member 16 comprises four successive and integral annular portions. The first portion lies in a plane transverse to the axis of the body 13 and extends radially over and beyond the perimeter of the pressure area of the second end member in over-lapping relation and its free edge or rim is turned over to form an annular bead 24. The second portion is frusto-conical and extends outwardly from the first portion and leads into a third co-axial portion which terminates in an outwardly flared lip. These portions form a skirt to retain the rolling lobe 15. It will be seen that the end of the guide ring 16 on which the bead 24 is formed fits into a reduced diameter section of the annular body 13 defining the junction of the bellows section 14 and the lobe section 15 of said body. The circular mounting plate 18 carries a bushing 25 which is internally threaded to receive a union member 26 of a pressure-fluid supply line 27.

The lobe section 15 is formed with an axially directed peripheral ridge 28 for a purpose hereinafter to be specified. As shown the upper edge of the ridge 28 is formed with diametrically opposed slots 29.

In operation air under pressure is supplied to the annular body through the supply line 27 and fills the bellows section 14 and the lobe section 15 of the body and also the cylindrical plunger 21. Movement of the member 11 towards the chassis member 12 in the axial direction of the body 13 causes the lobe section 15 to roll along the outer surface of the ring 22 and along the inner surface of the retaining skirt of the retaining member 16. Such formation and rolling of the lobe thereby gives the desired damping characteristic for small axial movements of the member 11. The rolling of the lobe section 15, however, reaches a limit when the annular ridge 28 engages the opposing inner surface of the body 13 held by the inwardly directed annular portion 24 of the guide ring 16. Beyond this limit continued deflection is opposed by action of the bellows section 14 which produces a considerably increased resistance to any further movement of the member 11. It will thus be seen that the lobe section 15 is effective only for small deflections of the member 11 and that the bellows section 14 is effective only for excessive deflections of the member 11.

Referring now to FIGURE 2 of the drawings, it will be seen that the retaining member 16 of this embodiment is formed with a radially-inwardly directed end piece 30 corresponding to the portion 24 of the ring 16 shown in FIGURE 1. In addition however an extended annular end face 31 is provided which serves to support the lower end of the bellows section 14 of the annular body thereby giving a greater degree of lateral stability. Furthermore in this embodiment an alternative form of securing ring 32 is provided for securing the lower end of the annular body 13 to the cylindrical plunger 21. In this embodiment, also, the end annular ridge corresponding to the ridge 28 in FIGURE 1 has been omitted.

If it is desired to provide in the embodiment shown in FIGURE 2 an annular ridge corresponding to the ridge 28 of FIGURE 1, the cylindrical plunger 21 may be arranged as shown in FIGURE 3 to carry a circular plate 33 upon which is mounted an annular ridge 34 of rubber or like resilient material.

In a further embodiment shown in FIGURE 4 of the drawings the guide ring 16 for the lobe is of the same form as that shown in FIGURE 1 but, in addition, is fitted with a ring 35 which provides an end face for supporting the lowermost part of the bellows section of the annular body 13. As will be seen, the bellows section in this embodiment is in two parts 14a and 14b defined by a rigid ring 36 which engages in a reduced diameter portion of the bellows and provides upper and lower supporting surfaces for the parts 14a and 14b.

Having now described my invention, what I claim is:

1. A fluid spring comprising two end members displaceable toward each other, one of said end members having a larger pressure area than that of the other end member, an annular retaining member between said end members overlapping the perimeter of the pressure area of the end member of lesser pressure area and having an annular skirt extending toward the end member of lesser pressure area, and a hollow body of resilient, flexible, material extending between and sealed fluid-tightly to said end members and bulging outwardly of the end member of larger pressure area in at least one bellows form and thence inwardly within said retaining member and skirt and in a rolling re-entrant lobe to said end member of lesser pressure area, said lobe being within the outer perimeter of said outwardly bulging bellows portion of said hollow body.

2. The spring of claim 1 in which said end member of lesser pressure area has a cylindrical surface extending axially away from said end member of larger pressure area and within said skirt.

3. The spring of claim 2 in which said annular retaining member has a surface extending radially outwardly in supporting contact with the lower surface of said outwardly bulging bellows portion of said hollow body.

4. The spring of claim 1 having an annular ridge on said end member of lesser pressure area in position to contact said retaining member within said skirt upon movement of said end member of lesser pressure area to said retaining member.

5. The spring of claim 4 in which said annular ridge is notched.

6. The spring of claim 1 in which said bulging portion of said hollow body forms a single bellows.

7. The spring of claim 1 in which said bulging portion of said hollow body forms at least two bellows folds and an intermediate section between said folds of lesser diameter and a rigid ring encircling said section of lesser diameter.

References Cited in the file of this patent
UNITED STATES PATENTS

| | | |
|---|---|---|
| 2,537,637 | Candlin | Jan. 9, 1951 |
| 2,773,686 | Nash | Dec. 11, 1956 |
| 2,933,308 | McGavern | Apr. 19, 1960 |
| 2,956,797 | Polhemus | Oct. 18, 1960 |

FOREIGN PATENTS

| | | |
|---|---|---|
| 446,516 | Germany | July 7, 1927 |
| 1,163,065 | France | Apr. 21, 1958 |